United States Patent
Van Raaphorst

(10) Patent No.: US 9,387,742 B2
(45) Date of Patent: Jul. 12, 2016

(54) SUSPENSION SYSTEM AND METHOD OF CONTROL

(71) Applicant: ArvinMeritor Technology, LLC, Troy, MI (US)

(72) Inventor: David Van Raaphorst, Auburn Hills, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 2 days.

(21) Appl. No.: 14/153,441

(22) Filed: Jan. 13, 2014

(65) Prior Publication Data

US 2015/0197133 A1 Jul. 16, 2015

(51) Int. Cl.
*B60G 17/052* (2006.01)
*B60G 17/016* (2006.01)
*B60G 17/0165* (2006.01)

(52) U.S. Cl.
CPC .......... *B60G 17/052* (2013.01); *B60G 17/0161* (2013.01); *B60G 17/0164* (2013.01); *B60G 17/0165* (2013.01); *B60G 2300/0262* (2013.01); *B60G 2300/07* (2013.01); *B60G 2400/204* (2013.01); *B60G 2400/252* (2013.01); *B60G 2400/258* (2013.01); *B60G 2400/51222* (2013.01); *B60G 2400/61* (2013.01); *B60G 2500/30* (2013.01); *B60G 2600/02* (2013.01); *B60G 2800/014* (2013.01); *B60G 2800/0192* (2013.01); *B60G 2800/214* (2013.01); *B60G 2800/914* (2013.01); *B60G 2800/915* (2013.01)

(58) Field of Classification Search
CPC ........................ B60G 17/0526; B60G 2500/30
USPC ................................ 280/6.159, 5.514; 701/37
See application file for complete search history.

(56) References Cited

U.S. PATENT DOCUMENTS

| | | | | |
|---|---|---|---|---|
| 4,693,185 A | * | 9/1987 | Easton et al. | 105/199.2 |
| RE33,601 E | * | 6/1991 | Asami et al. | 280/5.503 |
| 5,584,497 A | | 12/1996 | Lander et al. | |
| 6,898,501 B2 | * | 5/2005 | Schubert | 701/50 |
| 7,469,175 B2 | * | 12/2008 | Brandt et al. | 701/36 |
| 8,209,086 B2 | * | 6/2012 | Ohashi et al. | 701/37 |
| 2002/0066605 A1 | * | 6/2002 | McClelland et al. | 180/24.02 |
| 2002/0082752 A1 | * | 6/2002 | Obradovich | 701/1 |
| 2004/0084860 A1 | * | 5/2004 | Svartz et al. | 280/6.159 |
| 2006/0182588 A1 | * | 8/2006 | Beckett | B66F 9/07586 414/636 |
| 2008/0228352 A1 | * | 9/2008 | Brookes | B60G 17/0155 701/37 |
| 2008/0272562 A1 | * | 11/2008 | Sabelstrom et al. | 280/6.153 |

(Continued)

FOREIGN PATENT DOCUMENTS

DE 19718258 A1 11/1998
EP 2213486 A1 8/2010

(Continued)

OTHER PUBLICATIONS

European Patent Office, Extended Search Report for corresponding European Patent Application No. EP 15150692.0 mailed Sep. 22, 2015.

*Primary Examiner* — Karen Beck
(74) *Attorney, Agent, or Firm* — Brooks Kushman P.C.

(57) ABSTRACT

A suspension system and a method of control. A load force on a first axle assembly may be increased when a ride height of the first axle assembly differs from the ride height of the second axle assembly by more than a threshold amount and the ride height of the first axle assembly is not within a ride height tolerance.

20 Claims, 3 Drawing Sheets

(56) References Cited

U.S. PATENT DOCUMENTS

| | | | |
|---|---|---|---|
| 2009/0043451 A1* | 2/2009 | Harder et al. | 701/37 |
| 2009/0062985 A1* | 3/2009 | Ohashi | B60G 17/04 |
| | | | 701/37 |
| 2009/0194179 A1* | 8/2009 | Morris | B60G 17/0525 |
| | | | 137/625.11 |
| 2010/0152969 A1* | 6/2010 | Li et al. | 701/37 |
| 2011/0266410 A1* | 11/2011 | Khajepour et al. | 248/560 |
| 2012/0303193 A1* | 11/2012 | Gresser | 701/22 |
| 2013/0057399 A1* | 3/2013 | Panse | B60G 17/017 |
| | | | 340/440 |
| 2013/0228991 A1 | 9/2013 | Gerami-Manesch et al. | |
| 2014/0163820 A1* | 6/2014 | Nettelmann et al. | 701/37 |
| 2014/0172233 A1* | 6/2014 | Hiebert et al. | 701/37 |
| 2014/0195114 A1* | 7/2014 | Tseng et al. | 701/37 |
| 2015/0028552 A1* | 1/2015 | Seminara | 280/6.157 |
| 2015/0197133 A1* | 7/2015 | VanRaaphorst | B60G 17/052 |
| | | | 280/6.159 |

FOREIGN PATENT DOCUMENTS

| | | |
|---|---|---|
| FR | 2818606 A1 | 6/2002 |
| JP | H05169956 A | 7/1993 |
| JP | H10000911 A | 1/1998 |
| JP | H10157431 A | 6/1998 |
| JP | H10324135 A | 12/1998 |
| JP | 2001080335 A | 3/2001 |
| JP | 2003094925 A | 4/2003 |

* cited by examiner

SUSPENSION SYSTEM AND METHOD OF CONTROL

TECHNICAL FIELD

This patent application relates to a suspension system and a method of control.

BACKGROUND

An air bag suspension control system is disclosed in U.S. Pat. No. 5,584,497.

SUMMARY

In at least one embodiment, a method of controlling a suspension system is provided. The method may include increasing a load force upon a first axle assembly when a ride height of the first axle assembly differs from a ride height of a second axle assembly by more than a threshold amount and the ride height of the first axle assembly is not within a ride height tolerance.

In at least one embodiment, a method of controlling a suspension system is provided. The method may include determining a vehicle speed, a ride height of a first axle assembly, and a ride height of a second axle assembly. The load force on the first axle assembly may be increased when the vehicle speed is less than a threshold speed value, the ride height of the first axle assembly differs from the ride height of the second axle assembly by more than a threshold amount, the ride height of the first axle assembly is not within a ride height tolerance, and the load force is less than a target axle load.

In at least one embodiment, a suspension system for a vehicle is provided. The suspension system may include a first axle assembly, a second axle assembly, and a vehicle speed sensor. The first axle assembly may have an inflatable first air spring that supports a chassis of the vehicle and a first ride height sensor that detects a ride height of the first axle assembly. The second axle assembly may have an inflatable second air spring that supports the chassis and a second ride height sensor that detects a ride height of the second axle assembly. The vehicle speed sensor may provide data indicative of vehicle speed. The load force on the first axle assembly may be increased when the vehicle speed is less than a threshold speed value, the ride height of a first axle assembly differs from the ride height of the second axle assembly by more than a threshold amount, and the ride height of the first axle assembly is not within a ride height tolerance.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
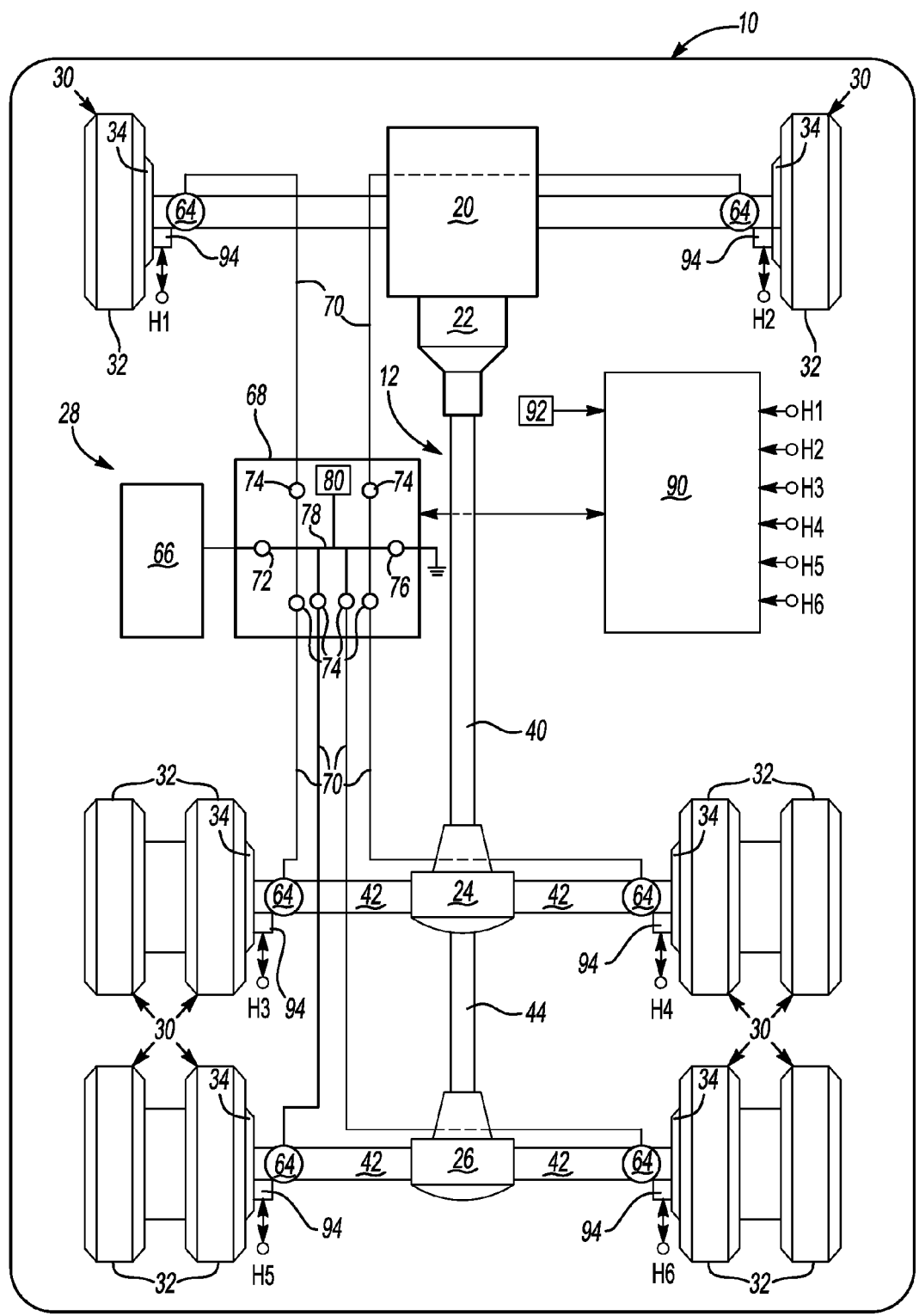
FIG. 1 is a schematic of a vehicle having a suspension system.

Referring to FIG. 1, an exemplary vehicle 10 is shown. The vehicle 10 may be of any suitable type, such as a motor vehicle like a truck, bus, farm equipment, military transport or weaponry vehicle, or cargo loading equipment for land, air, or marine vessels.

The vehicle 10 may have a drivetrain 12 that may provide torque to one or more wheel assemblies to propel the vehicle 10. The drivetrain 12 may have a hybrid configuration that may employ multiple power sources or a non-hybrid configuration. In a non-hybrid configuration, the drivetrain 12 may include an engine 20, and a transmission 22. Regardless of whether a hybrid or non-hybrid drivetrain configuration is employed, the vehicle 10 may also include a first axle assembly 24, a second axle assembly 26, and a suspension system 28.

The engine 20 may provide power or a propulsion torque that may be used to rotate one or more wheel assemblies 30 to propel the vehicle 10. For example, the vehicle 10 may have a set of wheel assemblies 30 that may include at least one tire 32 mounted on a wheel 34. In at least one embodiment, the engine 20 may be configured as an internal combustion engine that may be adapted to combust any suitable type of fuel, such as gasoline, diesel fuel, or hydrogen.

The transmission 22 may be coupled to or may be driven by the engine 20. The transmission 22 may be of any suitable type, such as a multi-gear "step ratio" transmission as is known by those skilled in the art. As used herein, the term transmission may also encompass or include a transfer case that may provide multi-wheel drive or all-wheel drive capability. For simplicity, a separate transfer case is not shown in FIG. 1.

The first axle assembly 24 may rotatably support one or more wheel assemblies 30. The first axle assembly 24 may be configured as a drive axle that may provide torque to rotate an associated wheel assembly 30 to propel the vehicle 10. For example, an output of the transmission 22 may be connected to an input of the first axle assembly 24 with a drive shaft 40. The first axle assembly 24 may have at least one output that may be coupled to a wheel assembly 30. For example, the first axle assembly 24 may be coupled to a corresponding wheel axle 42 or half-shaft upon which one or more wheel assemblies 30 may be disposed.

The second axle assembly 26 may also rotatably support one or more wheel assemblies 30. The second axle assembly 26, which may also be referred to as a tag axle or tag axle assembly, may or may not be configured as a drive axle that may provide torque to propel the vehicle 10. In a drive axle configuration, the first axle assembly 24 may be coupled to an input of the second axle assembly 26 via a prop shaft 44. In such a configuration, the second axle assembly 26 may be disposed rearward of the first axle assembly 24. In a non-drive axle configuration, torque may not be provided to the second axle assembly 26 and the prop shaft may be omitted. The second axle assembly 26 may also have at least one output that may be coupled to a wheel assembly 30. For example, the second axle assembly 26 may be coupled to a corresponding wheel axle 42 or half-shaft upon which one or more wheel assemblies 30 may be disposed.

Figure 2:
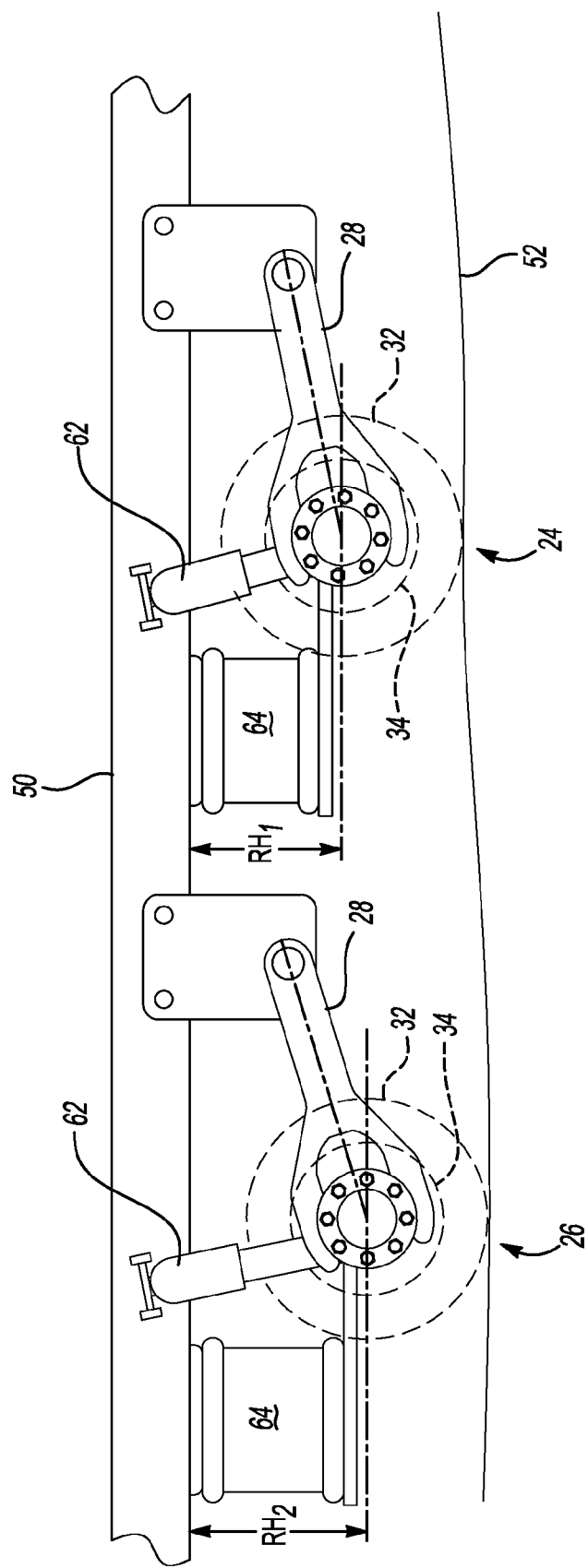
FIG. 2 is a side view of a portion of the vehicle and the suspension system.

Referring to FIGS. 1 and 2, the suspension system 28 is shown in more detail. The suspension system 28 may connect the first and second axle assemblies 24, 26 to a chassis 50 of the vehicle 10. In addition, the suspension system 28 may dampen vibrations, control axle movement, provide a desired level of ride quality, and control ride height or the distance between the chassis 50 and a support surface or road surface 52 that the tires 32 may engage. The suspension system 28 may be configured as an air suspension system or an air ride suspension system that may employ one or more shock absorbers 62 and one or more air springs 64. Such a suspension system 28 may also include a pressurized gas source 66 and a pressurized gas supply subsystem 68.

The shock absorber 62 may be provided to dampen shock impulses and dissipate kinetic energy. A shock absorber 62 may be associated with each wheel axle 42 and may extend between an axle assembly 24, 26 and the chassis 50 or another mounting surface.

The air spring 64 may be configured to absorb shocks and vibrations to improve ride quality. Each air spring 64 may be disposed above an axle assembly 24, 26 and under the chassis 50 to support the chassis 50 of the vehicle 10. In FIG. 1, an air spring 64 is disposed proximate a left wheel axle 42 and a right wheel axle 42 of each axle assembly 24, 26, although it is contemplated that a different number of air springs or different air spring configuration may be provided. For clarity, an air spring 64 associated with the first axle assembly 24 may be referred to as a first air spring and an air spring 64 associated with the second axle assembly 26 may be referred to as a second air spring. In at least one embodiment, a top plate or top portion of the air spring 64 may be disposed proximate or may engage the chassis 50 and may be fixedly positioned with respect to the chassis 50. A flexible bellows or bag may extend from the top plate to or toward a bottom plate or bottom portion that may be disposed opposite the top plate. The flexible bellows may at least partially define a chamber within the air spring 64. The chamber within the air spring 64 may be fluidly connected to the pressurized gas source 66 via a port that may be connected to the pressurized gas supply system 68. As such, the air spring 64 may be inflatable and may be inflated or deflated to help control ride height and/or load forces associated with an axle assembly as will be discussed in more detail below.

Referring to FIG. 1, the pressurized gas source 66 may be configured to supply and/or store a volume of a pressurized gas or pressurized gas mixture, such as air and/or nitrogen. For example, the pressurized gas source 66 may include a tank and/or a pump like a compressor that may be driven by a vehicle engine or vehicle power source. The pressurized gas source 66 may be disposed within the vehicle 10 and may be configured to provide a pressurized gas or pressurized gas mixture via the pressurized gas supply subsystem 68 at a pressure that is greater than or equal to a target air spring pressure. Each air spring 64 may or may not have the same target air spring pressure in one or more embodiments. For clarity, the term "pressurized gas" may refer to a pressurized gas or a pressurized gas mixture in this application.

The pressurized gas supply subsystem 66 may be configured to provide a pressurized gas or pressurized gas mixture from a pressurized gas source 66 to one or more set of air springs 64 via a corresponding conduit 70, such as a hose, tubing, pipe, or combinations thereof. The conduit configuration in FIG. 1 is merely exemplary. For instance, a single conduit 70 may be associated with multiple air springs 64, such as the air springs 64 associated with a particular axle assembly, rather than a single air spring 64. In at least one embodiment, the pressurized gas supply subsystem 66 may include an inlet valve 72, at least one outlet valve 74, and an exhaust valve 76.

The inlet valve 72 may enable or disable the flow of pressurized gas from an outlet of the pressurized gas source 66 to at least one outlet valve 74. The inlet valve 72 may include or may be controlled by an actuator, such as solenoid, that may actuate the inlet valve 72 between an open position and a closed position. In the open position, pressurized gas may flow from the pressurized gas source 66 to the pressurized gas supply subsystem 68. In the closed position, pressurized gas may be inhibited from flowing from the pressurized gas source 66 to the pressurized gas supply subsystem 68. In at least one embodiment, the inlet valve 72 may be normally closed under predetermined operating conditions, such as when the vehicle 10 is not operational or turned off or when the vehicle engine is not running. As such, the inlet valve 72 may inhibit depressurization of the pressurized gas source 66 in the event of a downstream leak. A manifold 78 may be disposed between the inlet valve 72 and one or more outlet valves 74 and may distribute pressurized gas to multiple conduits 70.

The outlet valve 74 may enable or disable the flow of pressurized gas from the gas supply subsystem 66 to an air spring 64. In FIG. 1, six outlet valves 74 are shown, although it is contemplated that a greater or lesser number of outlet valves 74 may be provided. Each outlet valve 74 may be associated with a different conduit 70 and a different axle spring 64 or a different set of air springs 64. Moreover, each outlet valve 74 may be actuated independently of the inlet valve 72 and independently of each other. As such, the inflation and pressure assessment of different air springs 64 or sets of air springs 64 may be independently controlled.

The outlet valve 74 may include or may be controlled by an actuator, such as solenoid, that may actuate the outlet valve 74 between an open position and a closed position. In the open position, pressurized gas may flow from the manifold 78 to at least one corresponding air spring 64. In the closed position, pressurized gas may be inhibited from flowing to at least one corresponding air spring 64. As such, pressurized gas may not be continuously provided to one or more air springs 64 in one or more embodiments. In addition, the outlet valve 74 have venting functionality or may allow a conduit 70 to be vented to the surrounding environment between the outlet valve 74 and a corresponding set of air springs 64. In at least one embodiment, the outlet valve 74 may be normally closed under predetermined operating conditions, such as when the vehicle 10 is not operational or turned off or when the vehicle engine is not running.

One or more pressure sensors 80 may be provided to monitor the pressure associated with one or more air springs 64. For example, a pressure sensor 80 may be fluidly connected to the manifold 78 and may be disposed between the inlet valve 72 and one or more outlet valves 74 so that the pressure sensor 80 may be used to detect the pressure of pressurized gas supplied to different air springs 62 by opening a particular outlet valve 74. Multiple pressure sensors 80 may be employed that may detect the pressure supplied to or within a particular conduit 70 or within a particular air spring 64.

A controller or control system 90 may monitor and/or control operation of various vehicle components. For example, the control system 90 may include one or more electronic controllers or control modules that may monitor and/or control components of the air suspension system 28. The control system 90 may be configured to control actuation of the inlet valve 72, the outlet valve 74, and the exhaust valve 76 to control the flow of pressurized gas to and/or from an air spring 64. In addition, the control system 90 may be configured to receive data from the pressure sensor 80 that may be indicative of pressure in an air spring 64.

The control system 90 may also communicate with and/or receive data from other sensors or devices, such as a vehicle speed sensor 92 and at least one ride height sensor 94.

A vehicle speed sensor 92 may detect or provide data indicative of a speed of the vehicle 10. For example, the vehicle speed sensor 92 may be provided with a drivetrain component, such as the transmission 22 or transaxle, a driveshaft, or an axle assembly shaft, to detect vehicle speed based on the rotational speed of a drivetrain component.

A ride height sensor 94 may detect or provide data indicative of ride height of an axle assembly. Ride height of an axle assembly may be indicative of the position of an axle assembly relative to the vehicle chassis 50. For example, ride height data may be representative of the distance from the chassis 50 to the center line of the axis of the wheel axle 42 or wheel hub. Thus, the ride height sensor 94 may detect or provide a signal indicative of how close an axle assembly is to the chassis 50.

A ride height sensor 94 may be provided with the first axle assembly 24 and with the second axle assembly 26. In FIG. 1, two ride height sensors 94 are provided with the first and second axle assembles 24, 26, but it is contemplated that a greater or lesser number of ride height sensors 94 may be provided. The ride height sensor 94 may be of any suitable type. Communication between the control system 90 and each ride height sensor 64 is represented by connection nodes H1 through H6 in FIG. 1.

Examples of different ride heights are shown in FIG. 2. In FIG. 2, the first axle assembly 24 has a ride height designated $RH_1$ while the second axle assembly 26 has a ride height designated $RH_2$. In FIG. 2, the ride height of the first axle assembly 24 is less than the ride height of the second axle assembly 26 (i.e., $RH_1 < RH_2$). In such a configuration, ride height may decrease when an axle assembly moves closer to the chassis 50 and may increase as an axle assembly moves further from the chassis 50.

Figure 3:
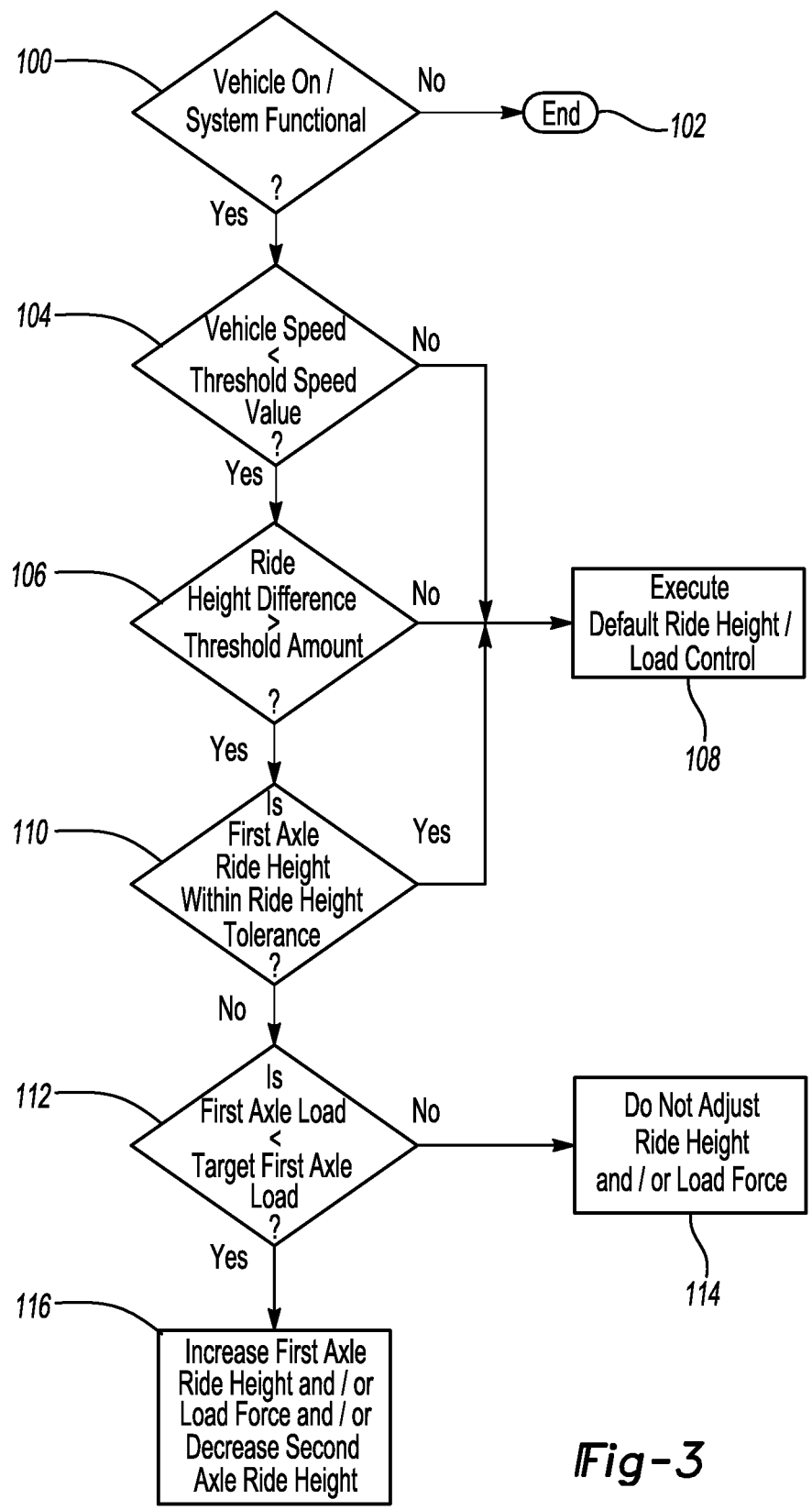
FIG. 3 is a flowchart of an exemplary method of controlling the suspension system.

Referring to FIG. 3, a flowchart of an exemplary method of control of the suspension system 28 is shown. As will be appreciated by one of ordinary skill in the art, the flowchart represents control logic which may be implemented or affected in hardware, software, or a combination of hardware and software. For example, the various functions may be affected by a programmed microprocessor. The control logic may be implemented using any of a number of known programming and processing techniques or strategies and is not limited to the order or sequence illustrated. For instance, interrupt or event-driven processing may be employed in real-time control applications rather than a purely sequential strategy as illustrated. Likewise, parallel processing, multitasking, or multi-threaded systems and methods may be used.

Control logic may be independent of the particular programming language, operating system, processor, or circuitry used to develop and/or implement the control logic illustrated. Likewise, depending upon the particular programming language and processing strategy, various functions may be performed in the sequence illustrated, at substantially the same time, or in a different sequence while accomplishing the method of control. The illustrated functions may be modified, or in some cases omitted, without departing from the scope intended.

In at least one embodiment, the method may be executed by the control system 90 and may be implemented as a closed loop control system. For brevity, the method will be described in the context of a single method iteration below. In addition, the method will be described below with respect to controlling first and second axle assemblies, but it is to be understood that additional axle assemblies may be controlled with the method.

At block 100, the method may assess the operating state of the vehicle, which may include assessing whether the suspension system and/or the control system is functional. For example, if the vehicle ignition is off, the engine is not running, or the suspension system and/or control system is not functional or functioning properly, then the method or current method iteration may end at block 102. If the vehicle is on and the suspension system and/or control system is functioning properly, then the method may continue to block 104.

At block 104, the vehicle speed may be compared to a threshold vehicle speed. The vehicle speed may be determined or detected by the vehicle speed sensor 92. The threshold vehicle speed may be a predetermined value, such as around 5 mph (8 kph). Moreover, the threshold vehicle speed may be independent of the direction of travel of the vehicle. As such, the threshold vehicle speed may be indicative of a vehicle speed in a forward or reverse direction. The threshold vehicle speed may be indicative of a vehicle speed at which the vehicle may have low momentum and therefore the drive axle may be relied on to provide sufficient tractive effort to propel the vehicle over uneven terrain, such as potholes or speed bumps. Sufficient momentum may be available to propel the vehicle over uneven terrain when the vehicle speed exceeds the threshold speed value. If the vehicle speed is less than the threshold vehicle speed, then the method may continue to block 106. If the vehicle speed is not less than the threshold vehicle speed, then the method may continue at block 108.

At block 106, a difference between the ride height of the first axle assembly ($RH_1$) and the ride height of the second axle assembly ($RH_2$) may be determined or calculated and compared to a threshold amount or threshold ride height difference. The ride heights of the first axle assembly 24 and the second axle assembly 26 may be determined or detected by corresponding ride height sensor 94. The threshold amount may be a predetermined value that may be based on the configuration of the suspension system 28 and/or vehicle development testing. As one example, the threshold amount may be about 65 mm. A ride height difference that exceeds the threshold amount may be indicative that the first axle assembly and second axle assembly are travelling on uneven terrain or an uneven road surface such that the first and second axle assemblies may be far apart. For instance, the first axle assembly 24 may be positioned close to the chassis 50 and the second axle assembly 26 may be remote from the chassis 50 or vice versa. If the ride height difference or difference between the ride height of the first axle assembly and the ride height of the second axle assembly (e.g., $RH_1 - RH_2$) is not greater than the threshold amount, then the method may continue to block 108. If the ride height difference or difference between the ride height of the first axle assembly and the ride height of the second axle assembly is greater than the threshold amount, then the method may continue to block 110.

At block 108, a default ride height/load control algorithm may be executed to control the ride height and/or load applied to first axle assembly 24 and the second axle assembly 26. Such an algorithm may adjust the ride height of an individual axle assembly 24, 26 if the ride height is outside of a predetermined ride height range and/or adjust the load force on an individual axle assembly 24, 26 if the load force upon and individual axle assembly 24, 26 is outside of a predetermined load force range. The ride height and/or load force may be based on a data sample that may include multiple ride height values or data points or load force values or data points. For instance, multiple ride height values may be statistically processed, such as by calculating a moving average and then the moving average may be compared to the predetermined ride height range. Similarly, multiple load force values may be statistically processed, such as by calculating a moving average and then the moving average may be compared to the predetermined load force range. The ride height of the first axle assembly 24 may be increased by providing pressurized gas to one or more air springs 64 that are associated with the first axle assembly 24 and may be decreased by venting pressurized gas from one or more air springs 64 or reducing the pressure in one or more air springs 64 that are associated with the first axle assembly 24. The ride height of the second axle assembly 26 may be increased by providing pressurized gas to one or more air springs 64 that are associated with the second axle assembly 26 and may be decreased by venting pressurized gas or from one or more air springs 64 or reducing the pressure in one or more air springs 64 that are associated with the second axle assembly 26. Decreasing the pressure in one or more air springs 64 of the second axle assembly 26 may also help shift load to the first axle assembly 24 or increase the load force on the first axle assembly 24 and/or pressure in an associated air spring 64.

At block 110, the ride height of the first axle assembly may be compared to a ride height tolerance. The ride height of the first axle assembly 24 may be based on data from one or more associated ride height sensors 94 as previously discussed. The ride height tolerance may be a predetermined value that may be representative of a predetermined distance from the chassis 50 to a point on the first axle assembly 24, such as the axis of the wheel axle 42. As such, the ride height tolerance may provide information indicative of the position of the first axle assembly 24 relative to the chassis 50. The ride height of the first axle assembly 24 may not exceed the ride height tolerance when the first axle assembly 24 is closer to the chassis 50 than the second axle assembly 26, such as may occur when the first axle assembly 24 is on a raised surface like a speed pump and/or when the second axle assembly 26 is in a depression like a pothole or extended away from the chassis 50. The ride height of the first axle assembly 24 may exceed the ride height tolerance when the first axle assembly 24 is further from the chassis 50 than the second drive axle 26, such as may occur when the first drive axle 24 is in a depression like a pothole or extended away from the chassis 50. If the ride height of the first axle assembly is within the ride height tolerance, then the method may execute a default ride height/load control algorithm at block 108 as previously discussed. If the ride height of the first axle assembly is not within the ride height tolerance, then the method may continue to block 112.

At block 112. the load force on the first axle assembly may be compared to a target axle load. The target axle load may be expressed as a target tolerance or a target value. The load force on the first axle assembly may be the current load force and may be based on air spring pressure of one or more air springs 64 associated with the first axle assembly 24. Such data may be provided by one or more pressure sensors 80. The target axle load may be indicative of a load force upon the first axle assembly 24 at which the normal force exerted by the tire upon the road is believed to provide sufficient tractive effort to propel the vehicle and/or avoid wheel slip. The target axle load may be a predetermined value or predetermined tolerance that may be based on the configuration of the vehicle and vehicle development testing. For instance, the target axle load may be based on air spring pressure, vehicle class, and/or gross vehicle weight. In at least one embodiment, a target tolerance or target axle load tolerance may represent an acceptable or desired amount of axle load that may provide sufficient tractive effort. If the load force on the first axle assembly is not less than the target first axle load or the load force on the first axle assembly is within a target axle load tolerance, then the method may continue a block 114. If the load force on the first axle assembly is less than the target first axle load or the load force on the first axle assembly is not within a target axle load tolerance, then the method may continue a block 116.

At block 114, the ride height and/or air spring pressure associated with the first axle assembly and/or the second axle assembly may not be adjusted. The ride height and/or air spring pressure may be maintained since the load force on the first axle assembly 24 may be sufficient to provide tractive effort to propel the vehicle, overcome obstacles, and/or avoid wheel slip. Reducing the ride height and/or air spring pressure upon the first axle assembly 24 or increasing the ride height of the second axle assembly 26 may reduce the normal force on the tire of the first axle assembly 24 and/or permit the first axle assembly 24 or an associated tire to move toward the chassis 50, which may decrease the tractive effort provided by the first axle assembly 24 upon the road surface 52 to propel the vehicle 10. Thus, the method may inhibit exhausting pressurized gas from a first axle assembly 24 when the second axle assembly 26 is closer to the chassis 50 than the first axle assembly 24 and the first axle assembly 24 is considered to be too far from the chassis 50. Thus, deflating an air spring of the first axle assembly 24 to attain a ride height target, such as may be employed at block 108, may not occur and an associated reduction in tractive effort from the first axle assembly 24 may be avoided.

At block 116, increased tractive effort provided by the first axle assembly may be desired. Increased tractive effort may be provided by increasing the ride height of the first axle assembly 24 and/or air spring pressure associated with one or more air springs 64 of the first axle assembly 24. Increasing the ride height may extend the first axle assembly 24 further from the chassis 50, which may improve contact between an associated tire and the road surface 52. Increasing the air spring pressure may increase the load force on the first axle assembly 24 and/or the normal force and traction exerted by an associated tire 32 against the road surface 52. Similarly additional tractive effort may be provided by decreasing the ride height of the second axle assembly 26. More specifically, decreasing the ride height of the second axle assembly 26 may help increase the load force exerted on the first axle assembly 24, which may in turn increase the normal force exerted by an associated tire. Adjustments may be made to the second axle assembly 26 separately from or in conjunction with adjustments to the first axle assembly 24. Air spring pressure adjustments made be made sequentially when air spring pressures are adjusted on both the first axle assembly 24 and the second axle assembly 26. For example, the pressure in an air spring of the second axle assembly 26 may be decreased after increasing pressure in an air spring 64 of the first axle assembly 24 in one or more embodiments. Such sequential adjustments may allow adjustments to be made to a first axle assembly 24 configured as a drive axle before potentially being supplemented by making adjustments to a second axle assembly 26 that may or may not be configured as a drive axle.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of controlling a suspension system comprising:
   determining a ride height of a first axle assembly and a ride height of a second axle assembly; and increasing a load force upon the first axle assembly when the ride height of the first axle assembly differs from the ride height of the second axle assembly by more than a threshold amount and the ride height of the first axle assembly is not within a ride height tolerance, and maintaining pressure in an air spring of the first axle assembly when the ride height of a first axle assembly differs from the ride height of the second axle assembly by more than the threshold amount, the ride height of the first axle assembly is not within the ride height tolerance, and the load force upon the first axle assembly is not less than a target axle load.

2. The method of claim 1 wherein increasing the load force upon the first axle assembly further comprises increasing pressure in the air spring of the first axle assembly.

3. The method of claim 1 further comprising increasing the load force upon the first axle assembly when the load force is less than the target axle load.

4. A method of controlling a suspension system comprising:
  determining a ride height of a first axle assembly and a ride height of a second axle assembly; and
  increasing a load force upon the first axle assembly when the ride height of the first axle assembly differs from the ride height of the second axle assembly by more than a threshold amount and the ride height of the first axle assembly is not within a ride height tolerance, and decreasing pressure in an air spring of the second axle assembly when the ride height of the first axle assembly differs from the ride height of the second axle assembly by more than the threshold amount, the ride height of the first axle assembly is not within the ride height tolerance, and the load force upon the first axle assembly is less than a target axle load.

5. The method of claim 4 wherein decreasing pressure in the air spring of the second axle assembly reduces the ride height of the second axle assembly.

6. The method of claim 4 wherein pressure in the air spring of the second axle assembly is decreased after increasing pressure in an air spring of the first axle assembly.

7. The method of claim 4 further comprising maintaining pressure in an air spring of the first axle assembly when the ride height of the first axle assembly differs from the ride height of the second axle assembly by more than the threshold amount, the ride height of the first axle assembly is not within the ride height tolerance, and the load force upon the first axle assembly is not less than the target axle load.

8. The method of claim 1 further comprising maintaining pressure in an air spring of the second axle assembly when the ride height of the first axle assembly differs from the ride height of the second axle assembly by more than the threshold amount, the ride height of the first axle assembly is not within the ride height tolerance, and the load force upon the first axle assembly is not less than the target axle load.

9. A method of controlling a suspension system comprising:
  determining a vehicle speed, a ride height of a first axle assembly, and a ride height of a second axle assembly; and
  increasing a load force on the first axle assembly when the vehicle speed is less than a threshold speed value, the ride height of the first axle assembly differs from the ride height of the second axle assembly by more than a threshold amount, the ride height of the first axle assembly is not within a ride height tolerance, and the load force is less than a target axle load, wherein the load force on the first axle assembly is not increased when the ride height of the first axle assembly is not within the ride height tolerance and the load force on the first axle assembly exceeds the target axle load.

10. The method of claim 9 wherein the load force on the first axle assembly is increased by increasing pressure in an air spring of the first axle assembly.

11. The method of claim 9 wherein the load force on the first axle assembly is increased by decreasing pressure in an air spring of the second axle assembly.

12. The method of claim 9 wherein the load force on the first axle assembly is increased by increasing pressure in an air spring of the first axle assembly and decreasing pressure in an air spring of the second axle assembly.

13. The method of claim 9 further comprising maintaining pressure in an air spring of the first axle assembly when the ride height of the first axle assembly differs from the ride height of the second axle assembly by more than the threshold amount, the ride height of the first axle assembly is not within the ride height tolerance, and the load force upon the first axle assembly is not less than the target axle load.

14. A suspension system for a vehicle comprising:
  a first axle assembly having an inflatable first air spring that supports a chassis of the vehicle and a first ride height sensor that detects a ride height of the first axle assembly;
  a second axle assembly having an inflatable second air spring that supports the chassis and a second ride height sensor that detects a ride height of the second axle assembly; and
  a vehicle speed sensor that provides data indicative of vehicle speed;
  wherein a load force on the first axle assembly is increased when the vehicle speed is less than a threshold speed value, the ride height of a first axle assembly differs from the ride height of the second axle assembly by more than a threshold amount, and the ride height of the first axle assembly is not within a ride height tolerance, and pressure in the second air spring is maintained when the ride height of the first axle assembly differs from the ride height of the second axle assembly by more than the threshold amount, the ride height of the first axle assembly is not within the ride height tolerance, and the load force upon the first axle assembly is not less than a target axle load.

15. The system of claim 14 wherein the load force on the first axle assembly is increased when the load force on the first axle assembly is less than the target axle load for the first axle assembly.

16. The system of claim 14 wherein the load force upon the first axle assembly is increased by providing pressurized gas to the first air spring and/or by venting pressurized gas from the second air spring.

17. The system of claim 14 wherein increasing the load force upon the first axle assembly increases traction between a tire of the first axle assembly and a road surface.

18. The system of claim 14 wherein the first axle assembly is located further from the chassis than the second axle assembly when the ride height of the first axle assembly is not within the ride height tolerance.

19. The system of claim 14 wherein the first axle assembly is a drive axle that is configured to provide torque to an associated wheel assembly to propel the vehicle.

20. The system of claim 14 wherein the second axle assembly is a non-drive axle that does not provide torque to an associated wheel assembly to propel the vehicle.

* * * * *